(Model.)
J. E. GURNEY.
GATE ROLLER AND HINGE.
No. 247,498. Patented Sept. 27, 1881.
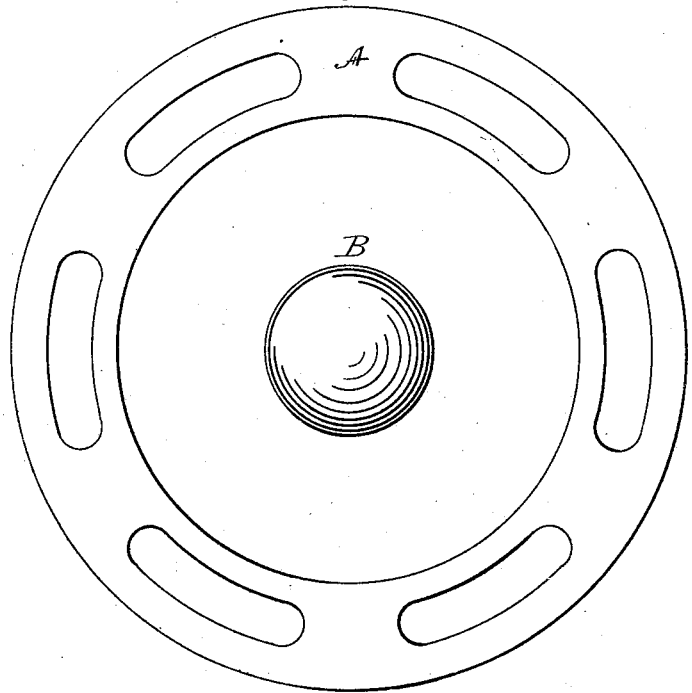
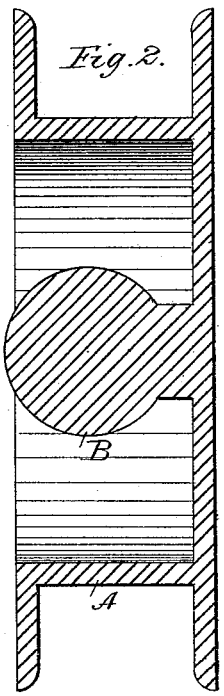
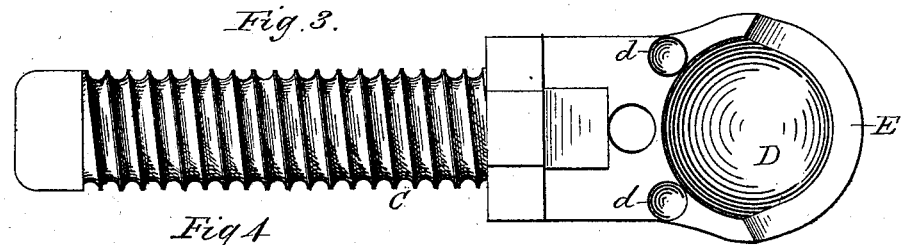
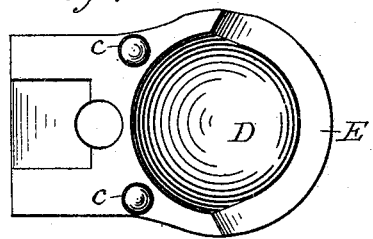
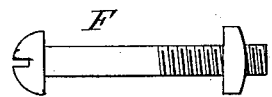
Witnesses
H. S. Hammack
J. W. Howard
Inventor
J. E. Gurney
by Bruesmerman & Rolee
his attorneys

UNITED STATES PATENT OFFICE.

JOSEPH E. GURNEY, OF BURLINGTON, IOWA.

GATE ROLLER AND HINGE.

SPECIFICATION forming part of Letters Patent No. 247,498, dated September 27, 1881.

Application filed May 23, 1881. (Model.)

*To all whom it may concern:*

Be it known that I, JOSEPH E. GURNEY, a citizen of the United States, residing at Burlington, Des Moines county, Iowa, have invented a new and Improved Gate Roller and Hinge, of which the following is a specification.

Figure 1 is a side view of the roller provided with the ball. Fig. 2 is a section of the same. Fig. 3 is a view of the threaded ball having a socketed head. Fig. 4 is a view of the removable part of socket-head, and also of the securing-bolt.

Similar letters of reference indicate corresponding parts.

I use an ordinary grooved wheel, preferably of cast-iron, combined by means of a ball-and-socket joint with a threaded bolt, which is screwed into the face of the corner of an upright fence-post.

In the drawings, A is a wheel with beveled or rounded flanges, and deeply recessed on its inner side, cast in one piece with the ball B, whose neck extends so far into the recessed wheel that the head of the ball B is almost in the same plane with the inner side of the wheel.

C is a threaded bolt, whose head D is a socket, of which the mouth part E, which is in the shape of a bevel angle, fits closely and securely around the neck of the ball B. The bevel lips of the socket allow the gate, when hung upon the wheel A, to swing freely, but do not allow it to go beyond the proper angle. The inner sides of the flanges of the wheel are beveled or rounded to prevent cutting, and the wheel itself is deeply recessed, as set forth, in order to bring the ball B and the wheel closer together, thereby bringing the bearings nearer the center and bringing the gate nearer the post. The outer side of the wheel A may be made solid or open, as preferred.

The socket D and the portion of the bolt C nearest the head are in two pieces, which are firmly secured together when the ball B is in place, preferably by a rivet, and the lips of the socket-pieces are preferably furnished the one with lugs *c c* and the other with corresponding slots, *d d*, into which they fit.

I know that cast-iron and other wheels and threaded bolts have been used with an upright post in a gate roller and hinge; but these I do not broadly claim.

What I claim and desire to secure is—

The grooved wheel A, provided with ball B, in one piece, in combination with the threaded bolt C, in two pieces, having lugs *c c* and slots *d d*, with socket-head, forming with ball B a ball-and-socket joint, substantially as and for the purpose set forth.

JOSEPH E. GURNEY.

Witnesses:
F. E. GREGG,
N. S. HAMMACK.